United States Patent [19]

Beck et al.

[11] Patent Number: 4,557,636
[45] Date of Patent: * Dec. 10, 1985

[54] INJECTION OF SOLIDS INTO A HIGH PRESSURE SLURRY STREAM

[75] Inventors: Jeffrey L. Beck; Ahmed A. El-Saie, both of Ponca City, Okla.

[73] Assignee: Conoco Inc., Ponca City, Okla.

[*] Notice: The portion of the term of this patent subsequent to Jun. 12, 2001 has been disclaimed.

[21] Appl. No.: 593,019

[22] Filed: Mar. 26, 1984

Related U.S. Application Data

[63] Continuation-in-part of Ser. No. 439,670, Nov. 8, 1982, Pat. No. 4,453,864.

[51] Int. Cl.$^4$ .............................................. B65G 53/30
[52] U.S. Cl. ........................................ 406/19; 406/93; 417/171
[58] Field of Search ................. 406/96, 117, 109, 153, 406/93, 12, 19; 417/171

[56] References Cited

U.S. PATENT DOCUMENTS

| | | | |
|---|---|---|---|
| 4,143,921 | 3/1979 | Sweeney et al. | 406/109 X |
| 4,143,922 | 3/1979 | Sweeney | 406/117 X |
| 4,409,746 | 10/1983 | Beck | 406/96 |
| 4,453,864 | 6/1984 | Beck et al. | 406/19 |

Primary Examiner—Jeffrey V. Nase
Assistant Examiner—L. E. Williams
Attorney, Agent, or Firm—William J. Miller

[57] ABSTRACT

An apparatus for multiple injection of slurry from a plurality of mine faces or other slurry sources into a slurry line comprises a unique method and apparatus for connecting each slurry injection point to the main slurry line by using a vortex junction apparatus. The vortex junction apparatus provides a means for passing the slurry from one junction point to the next junction point and at the same time provides a means for merging slurry from each injection point into the main slurry line. The junction apparatus also provides a source of water for each injection point, thus eliminating the need for a separate source of water. One embodiment provides for a junction where the main and branch slurry lines are at nearly the same pressure while a second embodiment provides for a junction where the branch slurry line is at a substantially lower pressure than the main slurry line.

7 Claims, 3 Drawing Figures

INJECTION OF SOLIDS INTO A HIGH PRESSURE SLURRY STREAM

RELATED APPLICATIONS

This application is a continuation-in-part application of U.S. Ser. No. 439,670 filed Nov. 8, 1982, entitled "Injection of Solids Into A High Pressure Slurry Stream" by Jeffrey L Beck and Ahmed A. El-Saie, now U.S. Pat. No. 4,453,864.

DISCUSSION OF THE PRIOR ART

The best prior art known to Applicants are applications U.S. Ser. No. 231,637 filed Feb. 5, 1981, and titled "Dredging Apparatus", now U.S. Pat. No. 4,409,746, which discloses a vortex chamber being used both as a dredging pump and as a lift apparatus; U.S. Ser. No. 218,857, now U.S. Pat. No. 4,449,862, filed Dec. 22, 1980, and titled "Vortex Injection Method and Apparatus" which discloses a vortex chamber being used as a lift apparatus; and U.S. Ser. No. 264,917, now U.S. Pat. No. 4,444,229, filed May 18, 1981, which discloses vortex apparatus used as a slurry concentrator in an underground mine, all of the above applications to the same inventor, Jeffrey L Beck, and assigned to the same assignee as this invention.

U.S. Pat. No. 4,143,922 issued Mar. 13, 1979, to William T. Sweeney and titled "Method of Multiple Point Injection for Slurry Pipeline" discloses one approach toward producing at a plurality of mine faces and injecting the slurry from each mine face into a main or single slurry line without the use of a central sump as normally required in an underground mine. For example, the patent includes means to accommodate the excess material being injected into the main slurry line by detecting the flow of slurry downstream from each slurry injection point and water injection point and varying the amount of injected water along with changes in pipe diameter to maintain proper velocities in the slurry pipeline at each point along the line. In the Sweeney patent, the maintenance of velocity in the pipeline requires a complex control system caused by the necessity for measuring the flow rate and adjusting the water injected into the slurry line at each slurry injection point in order to compensate for the variations in slurry injected from each mine face into its corresponding injection point.

BRIEF DESCRIPTION OF THE INVENTION

Unlike the parallel-type connection of each mine face across the main slurry line and water line, respectively, this invention comprises a series coupling of a vortex junction apparatus for each mine face or other source of slurry following the first mine face. The main line is coupled to the high pressure inlet and from the high pressure outlet to the next vortex junction high pressure inlet for each successive mine face. Each mine face or other slurry source receives its water from the low pressure outlet and injects its slurry into the branch slurry inlet. Booster pumps can be installed where necessary. Flow control can be added where desired to maintain the velocity constant by controlling the low pressure water leaving each vortex junction as well as water coupled directly across the first injection point.

DETAILED DESCRIPTION OF THE INVENTION

Figure 1:
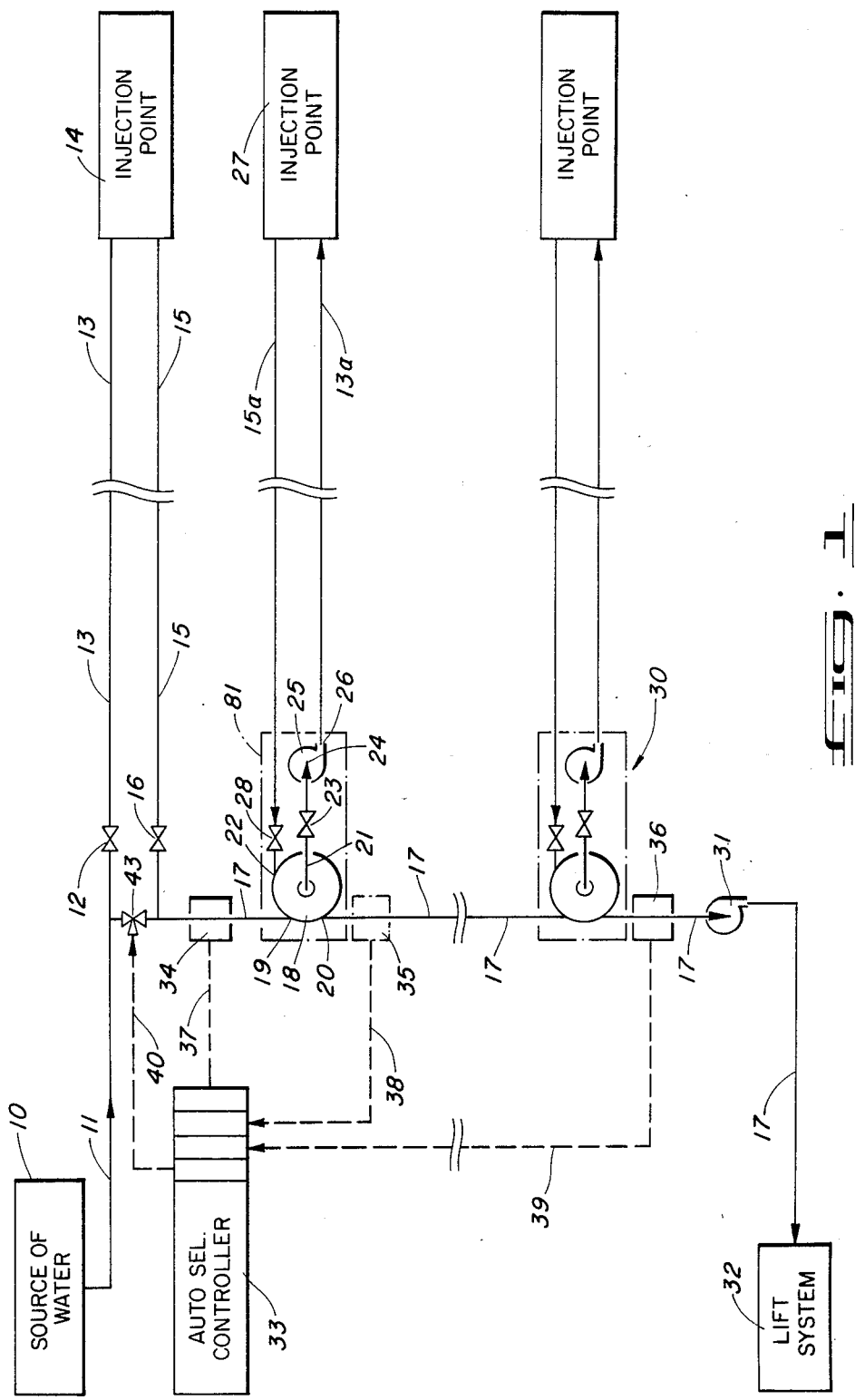
FIG. 1 is a plan view of a mine layout illustrating a slurry pipeline system carrying out the method of the invention.

Ordinarily, when coal is mined at a plurality of mine faces or other sources such as a surface mine, phosphate mining location and the like using a slurry system, the coal or mineral is conveyed either with a slurry system or by a conveyor to a central sump where it is dumped and then subsequently removed by a suction pump where it is transferred to a hoist or "main line" system for removal from the mine. Where the coal or mineral at each injection point is transferred by a slurry system, the coal or mineral can be dumped into a small portable sump where it is mixed with water and conveyed to the central sump, or it can be conveyed, as in the case of a longwall operation, to a fixed sump where it is mixed with water and conveyed to the central sump. One form of a central sump is illustrated in U.S. Pat. No. 4,143,921 issued Mar. 13, 1979, to W. T. Sweeney titled "Slurry Input for Multiple Feed Sump". These sumps are generally very large and expensive to build and require a substantial amount of maintenance along with control circuitry to operate them. It would simplify a slurry mining technique to eliminate the central sump and its associated equipment by the substitution of an apparatus which would permit injection of the coal from several mine faces directly into a single mine slurry line as the coal is produced. Such a system was first disclosed in the U.S. patent to W. T. Sweeney, U.S. Pat. No. 4,143,922, issued Mar. 13, 1979, entitled "Method of Multiple Point Injection for Slurry Pipelines." This patent describes a parallel system of operating a slurry injection system and functions by accepting fluid from a water line which runs to all of the mine faces where the water is injected into the portable sump and mixed with the coal to form a slurry. The slurry is then injected into a branch slurry line at each of the mine faces. The slurry from each mine face then enters a main slurry line at junction points along the main slurry line. In order to maintain adequate velocity in the main slurry line, a coupling is provided at each of the junction points between the water line and the slurry line which is valve controlled by a central computer. When slurry is being injected, water flow is reduced or stopped between the water line and the slurry line in accordance with detected flow through the main slurry line at that point. The system must require extremely careful flow control in order to maintain proper velocities in the main slurry line and, furthermore, does provide a higher percentage of water in this line in order to maintain the proper velocity regulation. The system also requires changes in the slurry line diameter to accommodate the increased fluid volume.

The aforementioned system is substantially improved in the invention disclosed herein where the injection points are each connected in series with the main slurry line rather than in parallel between main water and slurry line as in the previously described patents. Furthermore, the main slurry line diameter can remain the same throughout the mine thereby making movement of slurry injection locations much easier.

Referring to all of the figures but in particular to FIG. 1, a series connected injection system is disclosed which comprises a source of water 10 connected by a means of pipe 11 through a blocking valve 12 and a subsequent pipe 13 to a first injection point 14 which generally includes a portable sump, but could be a fixed sump, for mixing coal or other mineral being mined with the fluids. The injection point will also normally include a pump for removing the slurry from the sump. One form of injection point is illustrated in U.S. Pat. No. 3,845,990 by David L. McCain, titled "Slurry Hopper System" and assigned to the same assignee as this invention. The slurry is formed at the injection point, leaves by means of pipe 15 through a blocking valve 16 to the main slurry line 17 which is then coupled to the first vortex junction 81 which includes a vortex chamber 18. One form of a vortex junction is described as a slurry concentrator in the previously mentioned U.S. patent application Ser. No. 264,917 to Jeffrey L. Beck and will not be further described here; however, a brief description of its operation will be further described in FIG. 2. A second form of a vortex junction is completely described as a vortex injection apparatus in the previously mentioned patent application Ser. No. 218,857 also to Jeffrey L Beck and will not be further described here; however, a brief description of its operation will be further described in FIG. 3. Each vortex junction has a high pressure inlet 19, a high pressure outlet 20, a low pressure outlet 21, and a second inlet 22 which may be high pressure as will be illustrated in FIG. 2 or a low pressure as illustrated in FIG. 3. The high pressure outlet 20 is connected to the next succeeding portion of main slurry line 17. The low pressure outlet product will comprise mainly water and is coupled through a blocking valve 23 to the inlet 24 of a booster pump 25. The outlet 26 of booster pump 25 is coupled through a pipe 13a to the second injection point 27. The outlet of the second injection point 27 is coupled through slurry line 15a through a blocking valve 28 to the inlet 22 of vortex chamber 18. There can be any number of subsequent junction points as illustrated by the arrow 30. Since each subsequent junction point 30 will be subsequently identical to the previous junction point, there will be no need to describe each further junction point. As required, additional booster pumps 31 can be mounted along main slurry line 17 to increase the pressure of the slurry in line 17. Main slurry line 17 is eventually coupled to lift system 32 which will transport the slurry outside the mine and to a separate facility which removes the water from the slurry and processes the coal or other material in the usual manner for the mine. In order to assure the proper velocity through the system, an autoselect controller 33 (which may also be a computer) has at least one flow meter 34, which measures the velocity through main slurry line 17 at a location between the first and second injection points 14 and 27, respectively, and transfers the information through means 37, to autoselect controller 33. A densitometer 36 attached to slurry line 17 communicates its output through a means 39 to an input of autoselect controller 33. The controller processes the inputs and applies an output through means 40 to a control valve 43.

Operation

For the initial startup procedure, valves such as 12 and 16 and 23 and 28 will be closed and valve 43 will be opened. Water will then be supplied from water source 10 down pipe 11 through control valve 43 and into main slurry line 17. Vortex chamber 18 will be filled along with all of main slurry line 17 and each succeeding vortex chamber will be filled as well as all booster pumps such as 31 to lift system 32. Once the main slurry line and its components are filled, blocking valves 12 and 16 are opened and water is supplied to injection point 14. Then blocking valves 23 and 28 are opened supplying water to injection point 27. Each succeeding injection point that is to be used is similarly filled with water. The autoselect controller 33 has two main functions in the system. First, it must always, through minimum controlled closure of valve 43, maintain a predetermined minimum flow in slurry line 17. If a minimum flow is not maintained, then the solids will settle out of the water carrier fluids causing the line to plug or become less efficient, and, second, it must maintain a predetermined maximum density in the slurry line 17. Too high a density will also cause a reduction in flow and possible plugging. Ideally, the system, then, should have at least one flow meter near the first injection point and at least one density meter following the last injection point. Other flow meters, such as 35 and coupling means 38, or densitometers may be included at various points in the line when better control is considered necessary. Once coal or other mineral has begun to be added to injection point 14, for example, some of the volume of water will be replaced with coal or mineral. Since the same volume of water is pumped through pipes 13 and 15, an increase in flow will be detected at the line flow meter 34 which will be connected through means 37 to autoselect controller 33. This controller will then communicate the proper response through means 40 to control valve 43 to reduce or increase the flow of water from line 11 to main slurry line 17 resulting in a change in flow in line 17 and adjusting the flow to a predetermined set amount. If coal or mineral is being added, for example, to injection point 27, the coal or mineral will replace part of the water in line 15a. Since most injection points contain a fluid level monitoring apparatus on the sump, a valve will close down the fluids coming from pipe 13a in order to maintain the sump at a constant level. The coal or mineral being added to line 15a will cause an increase in the density sensed by densitometer 36 and communicated to autoselect controller 33 via line 39. A signal will be communicated through means 40 to control valve 43 in the event the density exceeds a predetermined maximum value, thereby increasing the total flow through the system. Each succeeding injection point will function in substantially the same way as the two injection points above described with any density change being monitored by densitometer 36 and transferred by means 39 to autoselect controller 33. In the system illustrated booster pumps 24 and 31 have been included. It is obvious in some conditions that neither booster pump may be needed. The booster pump will be required for line 13a, for example, if pressure problems require additional pressure in the line.

It can be seen from the above description that the series connected circuit illustrates an extremely easy startup and an extremely easy way to monitor and control injection of solids at the various stations.

Figure 2:
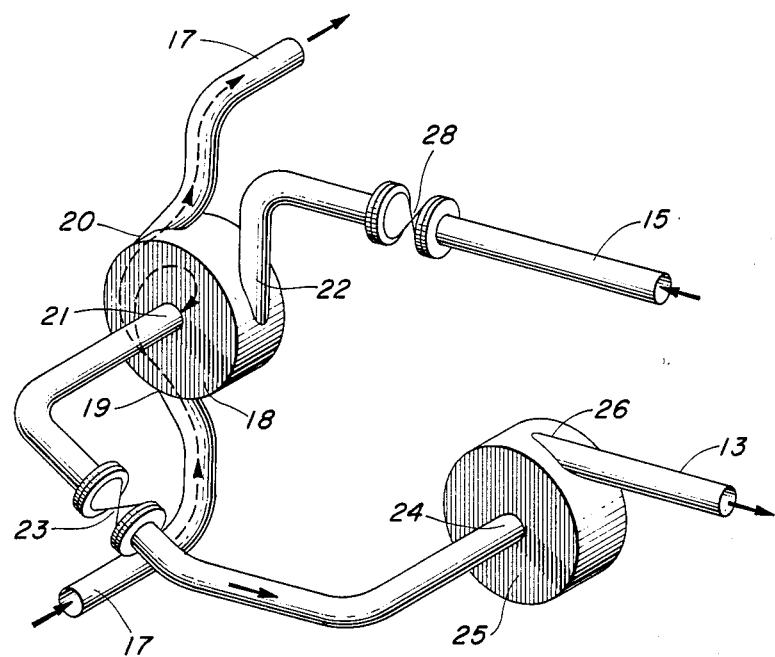
FIG. 2 is a perspective view of the vortex junction showing the vortex chamber, the connections of the pipes to and from the chamber and the coupling to an optional booster pump.
Figure 3:
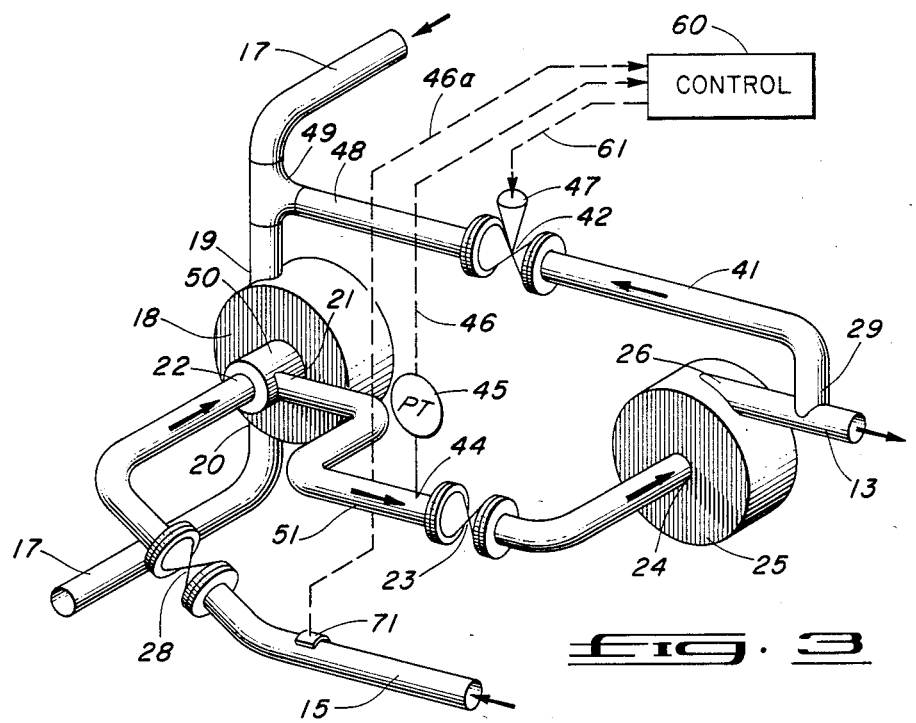
FIG. 3 is a perspective view of a modified apparatus illustrated in FIG. 2.

Referring to FIG. 2, a perspective view of the vortex junction portion of the apparatus of FIG. 1 is illustrated showing a vortex chamber 18 having the main slurry line 17 coupled to the input 19 and an output 20 coupled to the succeeding portion of main slurry line 17. The low pressure outlet 21 is coupled through valve 23 to the inlet 24 of an optional booster pump 25. Its outlet 26 is coupled to the pipe 13 which communicates the fluids to the injection point as illustrated in FIG. 1. The return pipe 15 from the injection point passes through valve 28 and to an inlet 27. The configuration illustrated in FIG. 2 shows the vortex chamber mounted so that its axis is horizontal. It is obvious this would normally require more space than if it were vertical. The system will function either way just as well. In the case where the axis is horizontal it is preferred to have outlet 20 above inlet 19 since an emergency shutdown may cause vortex chamber 18 to fill with material which would settle and make startup difficult. It is also preferred to have inlet 19 at the bottom so that the high pressure in line 17 can dislodge any settled material.

The vortex junction shown in FIG. 2 is very similar to the previously mentioned slurry concentrator disclosed in U.S. patent application Ser. No. 264,917 to Jeffrey L. Beck, the only difference being the addition of a second tangential inlet 22 at the perimeter of vortex chamber 18.

A second embodiment of the apparatus is illustrated in FIG. 3. In this embodiment pipe 15 is coupled through valve 28 to an input 22 which is at the axis of vortex chamber 18. A concentric pipe 50 is mounted around inlet 22 and accommodates the low pressure outlet 21 of the vortex chamber which is coupled through valve 23 to inlet 24 of centrifugal pump 25. In order to make the system illustrated in FIG. 3 work, fluid must be transferred continuously from the center to the periphery of the vortex or else the lower pressure vortex will not form. In order to accomplish this, water is communicated through an inlet 29 of pipe 41 to a control valve 42 and from there through pipe 48 to a junction 49 which is coupled to main slurry line 17 at the input 19 of vortex chamber 18 or directly into vortex chamber 18 through a second tangential inlet (not shown). A pressure transducer port 44 is mounted at pipe 51 and is coupled to pressure transducer 45 which is used in conjunction with an analog or digital controller and control valve 42 to regulate the pressure in pipe 51. The output of pressure transducer 45 is coupled through means 46 to controller 60. A controller 60 has an output coupled through means 61 to the control 47 to valve 42. If control of the flow rate in pipe 15 is desired, a flow meter 71 can be installed in pipe 15 and its output connected through a means 46a to controller 60. Pressure transducer 45 can be eliminated in this case.

The system of FIG. 3 operates in much the same manner as the apparatus described in FIGS. 1 and 2. The only difference is that the outlet from vortex chamber 18 forms a concentric pipe around inlet 22 and inlet 22, rather than being a high pressure inlet, is a low pressure inlet since it is entering near the center of vortex chamber 18. Inlet 22 can also be coaxially positioned on the opposite side of vortex chamber 18. In order to control the flow of fluids from the center of the vortex to the periphery through pipes 41 and 48, the pressure is continually monitored at port 44 through pressure transducer 45 which response is communicated through output 46, controller 60 and through controller output 61 to valve control 47. Thus every pressure variation in pipe 51 will cause a change in the setting of the valve 42 and result in an alteration in the amount of fluid transferred from pipe 13 to pipe 17. It is also obvious that other means can provide the signal for controlling the flow of fluids from pump 25 to inlet 19 such as a differential pressure transmitter for measuring differential pressure between pipes 51 and 48 or a flow meter in pipe 51 which have their output coupled to controller 60, for example.

Conclusions

An extremely efficient series system has been disclosed for operating a plurality of injection points using a vortex junction to couple each injection point succeeding the first injection point to the main slurry line. The vortex junction apparatus provides an unusual means to facilitate ease in injecting slurry into the main slurry line and at the same time separate fluid from the slurry for recycling to the injection point. In this configuration no separate pipe need be run through the mine for the purpose of carrying fluid to each injection point in the mine. The lack of such pipe will not only provide additional space in the mine but also reduce the cost of installation drastically. The control circuits for maintaining a proper flow in the main slurry line are simple and easy to function since the only control responding to a change in flow is a bypass valve which transfers water from the source of water to the main slurry line. Since it is not necessary to change the main line pipe diameter at each junction point, the ease with which junction points can be relocated along the main line will be much greater than in a parallel type system, which requires a change in the main slurry line diameter at each junction point. Relocation of the junction points is necessary as mining progresses.

The system has been specifically described for use in an underground coal mine. It is obvious that the system can be used at any location either underground or on the surface. It is further obvious that any mineral or material can be injected into the system including fluid other than water.

It is also obvious that changes can be made in the application and still be within the spirit and scope of the invention as disclosed in the specification and appended claims.

What is claimed is:

1. A multipoint injection system for first and succeeding slurry sources, said system having a source of water connected to said first slurry source with a slurry from said first slurry source coupled to a main slurry line, controllable bypass valve means coupled between said source of water and said main slurry line, vortex junction apparatus at a location servicing each succeeding slurry source, said vortex junction apparatus having a high pressure inlet and a high pressure outlet, a low pressure outlet and a slurry inlet, means coupling each vortex junction apparatus in series with said high pressure inlet and said high pressure outlet coupled in series with said main slurry line, and means coupling said last vortex high pressure outlet to a transfer system, means for coupling each of said low pressure outlets to said corresponding slurry source for supplying fluids to said slurry source and means for coupling slurry from said slurry source to said corresponding vortex junction apparatus slurry input, flow measuring means coupled to said main slurry line from said first slurry source and generating an output, means accepting said output and generating a control signal to said bypass control valve for maintaining said flow in said main slurry line at a predetermined value.

2. Apparatus as described in claim 1 wherein the slurry output from each succeeding slurry source is coupled into a vortex junction apparatus having a high pressure slurry inlet.

3. Apparatus as described in claim 1 wherein the slurry output from each succeeding slurry source is coupled into a vortex junction apparatus having a low pressure slurry inlet and including fluid feedback means from said low pressure outlet to said high pressure inlet.

4. Apparatus as described in claim 1, 2 or 3 wherein a densitometer is coupled to said main slurry line following said last vortex junction apparatus, and having an output communicating with said means for accepting said flow measuring means output.

5. Apparatus as described in claim 1, 2 or 3 wherein a booster pump having an outlet and an inlet is incorporated with said booster pump having its inlet connected to said low pressure outlet of said vortex injection apparatus and its outlet coupled to said slurry source.

6. Apparatus as described in claim 3 including a valve having a control means, in said fluid feedback means and pressure sensing means in said low pressure outlet coupled to said control means for regulating the fluid flow through said fluid feedback means.

7. Apparatus as described in claim 3 including a flow measuring apparatus in said means for coupling said slurry from said mine face to said corresponding vortex junction apparatus input for regulating the fluid flow through said fluid feedback means.

* * * * *